US007503006B2

(12) United States Patent
Danieli

(10) Patent No.: US 7,503,006 B2
(45) Date of Patent: Mar. 10, 2009

(54) VISUAL INDICATION OF CURRENT VOICE SPEAKER

(75) Inventor: Damon V. Danieli, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 10/671,361

(22) Filed: Sep. 25, 2003

(65) Prior Publication Data

US 2005/0075885 A1 Apr. 7, 2005

(51) Int. Cl.
*G06F 3/00* (2006.01)
*G06F 3/048* (2006.01)

(52) U.S. Cl. .................. 715/751; 709/204; 463/42; 463/43; 715/753; 715/759; 715/765; 715/800; 715/802

(58) Field of Classification Search ................. 715/753, 715/758, 759, 751, 765, 800, 802, 803; 709/204; 463/42, 43
See application file for complete search history.

(56) References Cited

U.S. PATENT DOCUMENTS

| 5,149,104 | A | | 9/1992 | Edelstein | 273/434 |
| 5,382,972 | A | * | 1/1995 | Kannes | 348/14.07 |
| 5,491,743 | A | * | 2/1996 | Shiio et al. | 709/204 |
| 5,566,291 | A | * | 10/1996 | Boulton et al. | 715/709 |
| 5,619,555 | A | * | 4/1997 | Fenton et al. | 379/88.11 |
| 5,736,982 | A | * | 4/1998 | Suzuki et al. | 715/706 |
| 5,742,329 | A | * | 4/1998 | Masunaga et al. | 348/14.07 |
| 5,793,365 | A | * | 8/1998 | Tang et al. | 715/758 |
| 5,999,208 | A | * | 12/1999 | McNerney et al. | 348/14.08 |
| 6,014,135 | A | * | 1/2000 | Fernandes | 715/744 |
| 6,040,841 | A | * | 3/2000 | Cohen et al. | 345/473 |
| 6,119,147 | A | * | 9/2000 | Toomey et al. | 709/204 |
| 6,183,367 | B1 | * | 2/2001 | Kaji et al. | 463/42 |
| 6,192,395 | B1 | * | 2/2001 | Lerner et al. | 709/204 |
| 6,219,045 | B1 | * | 4/2001 | Leahy et al. | 715/757 |

(Continued)

FOREIGN PATENT DOCUMENTS

EP 1362623 A2 11/2003

OTHER PUBLICATIONS

IGN Staff, Half-Life 1.108 Test Drive—"The upcomming updates adds two cool features for even more multiplayer goodness." Aug. 31, 2001, http://pc.ign.com/articles/097/097952p1.html, p. 1-4.*

(Continued)

*Primary Examiner*—Steven B Theriault
(74) *Attorney, Agent, or Firm*—Workman Nydegger

(57) ABSTRACT

Visually identifying one or more known or anonymous voice speakers to a listener in a computing session. For each voice speaker, voice data include a speaker identifier that is associated with a visual indicator displayed to indicate the voice speaker who is currently speaking. The speaker identifier is first used to determine voice privileges before the visual indicator is displayed. The visual indicator is preferably associated with a visual element controlled by the voice speaker, such as an animated game character. Visually identifying a voice speaker enables the listener and/or a moderator of the computing session to control voice communications, such as muting an abusive voice speaker. The visual indicator can take various forms, such as an icon displayed adjacent to the voice speaker's animated character, or a different icon displayed in a predetermined location if the voice speaker's animated character is not currently visible to the listener.

24 Claims, 7 Drawing Sheets

U.S. PATENT DOCUMENTS

| | | | |
|---|---|---|---|
| 6,237,025 B1* | 5/2001 | Ludwig et al. | 709/204 |
| 6,241,612 B1* | 6/2001 | Heredia | 463/42 |
| 6,330,022 B1* | 12/2001 | Seligmann | 348/14.08 |
| 6,496,201 B1* | 12/2002 | Baldwin et al. | 715/753 |
| 6,559,863 B1* | 5/2003 | Megiddo | 715/753 |
| 6,714,519 B2* | 3/2004 | Luzzatti et al. | 370/252 |
| 6,772,195 B1* | 8/2004 | Hatlelid et al. | 709/204 |
| 6,772,335 B2* | 8/2004 | Curtis et al. | 713/163 |
| 6,784,901 B1* | 8/2004 | Harvey et al. | 715/757 |
| 6,807,562 B1* | 10/2004 | Pennock et al. | 709/204 |
| 6,928,329 B1* | 8/2005 | Giaimo et al. | 700/94 |
| 6,975,991 B2* | 12/2005 | Basson et al. | 704/271 |
| 7,039,677 B2* | 5/2006 | Fitzpatrick et al. | 709/204 |
| 7,056,217 B1* | 6/2006 | Pelkey et al. | 463/43 |
| 7,090,582 B2* | 8/2006 | Danieli et al. | 463/35 |
| 7,099,798 B2* | 8/2006 | Yu et al. | 702/186 |
| 7,111,045 B2* | 9/2006 | Kato et al. | 709/205 |
| 7,124,372 B2* | 10/2006 | Brin | 715/751 |
| 7,143,356 B1* | 11/2006 | Shafrir et al. | 715/751 |
| 7,181,690 B1* | 2/2007 | Leahy et al. | 715/706 |
| 7,185,054 B1* | 2/2007 | Ludwig et al. | 709/204 |
| 7,234,117 B2* | 6/2007 | Zaner et al. | 715/758 |
| 7,240,093 B1* | 7/2007 | Danieli et al. | 709/205 |
| 7,278,921 B1* | 10/2007 | Fujisawa et al. | 463/42 |
| 7,311,608 B1* | 12/2007 | Danieli et al. | 463/42 |
| 2002/0024947 A1* | 2/2002 | Luzzatti et al. | 370/352 |
| 2002/0085029 A1* | 7/2002 | Ghani | 345/751 |
| 2002/0098890 A1* | 7/2002 | Sakaguchi | 463/42 |
| 2002/0130904 A1* | 9/2002 | Becker et al. | 345/753 |
| 2002/0143876 A1* | 10/2002 | Boyer et al. | 709/205 |
| 2002/0147777 A1* | 10/2002 | Hackbarth et al. | 709/205 |
| 2002/0160838 A1* | 10/2002 | Kim | 463/42 |
| 2002/0161882 A1* | 10/2002 | Chatani | 709/224 |
| 2003/0081750 A1 | 5/2003 | Berstis | 379/202.01 |
| 2003/0156134 A1* | 8/2003 | Kim | 345/753 |
| 2003/0216178 A1* | 11/2003 | Danieli et al. | 463/35 |
| 2003/0216181 A1* | 11/2003 | Danieli et al. | 463/39 |
| 2003/0216183 A1* | 11/2003 | Danieli et al. | 463/42 |
| 2003/0236835 A1* | 12/2003 | Levi et al. | 709/204 |
| 2004/0006595 A1* | 1/2004 | Yeh et al. | 709/204 |
| 2004/0028199 A1* | 2/2004 | Carlson | 379/93.21 |
| 2004/0085334 A1* | 5/2004 | Reaney | 345/706 |
| 2004/0091086 A1* | 5/2004 | Ortel | 379/88.02 |
| 2004/0109023 A1* | 6/2004 | Tsuchiya | 345/758 |
| 2004/0179038 A1* | 9/2004 | Blattner et al. | 345/751 |
| 2004/0179039 A1* | 9/2004 | Blattner et al. | 345/758 |
| 2004/0203766 A1* | 10/2004 | Jenniges et al. | 455/435.1 |
| 2004/0221224 A1* | 11/2004 | Blattner et al. | 715/500.1 |
| 2004/0224772 A1* | 11/2004 | Canessa et al. | 463/42 |
| 2004/0246121 A1* | 12/2004 | Beyda | 340/506 |
| 2005/0070359 A1* | 3/2005 | Rodriquez et al. | 463/42 |
| 2005/0181878 A1* | 8/2005 | Danieli et al. | 463/42 |
| 2005/0209002 A1* | 9/2005 | Blythe et al. | 463/42 |
| 2005/0210394 A1* | 9/2005 | Crandall et al. | 715/752 |
| 2005/0232404 A1* | 10/2005 | Gaskill | 379/201.06 |
| 2005/0245317 A1* | 11/2005 | Arthur et al. | 463/42 |
| 2006/0025220 A1* | 2/2006 | Macauley et al. | 463/42 |
| 2006/0107227 A1* | 5/2006 | Kiljander | 715/772 |
| 2006/0121992 A1* | 6/2006 | Bortnik et al. | 463/43 |
| 2006/0235932 A1* | 10/2006 | Celi et al. | 709/207 |

OTHER PUBLICATIONS

Tom Ham, Half-Life Gets A Voice—"The next update for Half-Life is set to up the gaming ante by including its own voice technology." Jun. 2006, http://archive.gamespy.com/articles/june01/hlmod2a/, p. 1-3.*

Tom Ham, Half-Life Gets A Voice Index Jun. 2001, http://archive.gamespy.com/articles/index.shtm.*

Garmer, "The Multicast Spectator Mode / Voice Communication" Sep. 2, 2001, http://www.cs-extreme.net/features/cs13techinfo/techinfo.asp, p. 1.*

Roth, Kurtis (Reviewer). May 24, 2003. *SOCOM: US Navy SEALs*. 2pp. Available: http://www.sff.net/people/kurtisroth/socomreview.htm.

IGN Entertainment, Inc. 2003. E3 2003: *SOCOM 2*. 3pp. Available: http://ps2.ign.com/articles/401/401665p1.html.

Unreal Tournament 2003. Jun. 26, 2003. *UT2003 chatting balloon*. Available www.unrealtournament2003.com/au/comments.php?nId=69&type=archive.

*Voice Conference: coooolcats-52746*. 1pg. Yahoo Messenger Version 5, 6, 0, 1347 printed Sep. 5, 2003.

*Chatting In Game*. 1pg. Screen Print of Quake III Text Chat Commands. Captured Aug. 14, 2003.

*Controls*. 1pg. Screen Print of Quake III Text Chat Bubble. Captured Aug. 14, 2003.

* cited by examiner

VISUAL INDICATION OF CURRENT VOICE SPEAKER

FIELD OF THE INVENTION

The present invention generally relates to visually indicating which of a plurality of speakers is currently talking, and more specifically, pertains to providing a visual indication of a current voice speaker from among a plurality of voice speakers engaged in a common computing session, wherein each voice speaker is not necessarily known to a listener.

BACKGROUND OF THE INVENTION

Voice communication for gaming and other electronic activities is becoming increasingly popular, particularly for individuals connected over the Internet or other network. For those participating in multiplayer games, voice communication greatly expands the depth of enjoyment and social interaction between players of a game. However, multiplayer games often involve players who are unknown to each other. In addition, the sound of a player's voice can readily be altered so that it is not recognizable. For example, many players from all over the world may connect over the Internet to a server-based gaming service, and anonymously communicate with each other while participating in a game session together.

There are a number of systems that enable players to establish voice communications between each other, independent of a game session. Players can use telephone conferencing systems that use caller identification (caller-ID) data to identify participants. However, caller-ID data reveals information that anonymous players might not wish to divulge. Other examples include Microsoft Corporation's SIDEWIDER GAME VOICE™ and GameSpy Industries, Inc.'s ROGER WELCO™ systems. These systems require players to exchange communication address information and make direct connections. However, exchanging address information and making direct connections are often not convenient or desirable. Setting up independent voice communication takes time, and interrupts game play. Those players who have a static communication address may not wish to divulge this information to other players for fear of a possible misuse of the communication address. Alternatively, a player may find that after establishing communication, another player uses vulgar or threatening language. In that case, the player, or a game hosting service, may wish to mute or otherwise discontinue communication by the other player. Further, these independent voice communication systems do not enable the voice communication to be related to the game activity. For example, it may be desirable to prohibit voice communication between certain players if animated characters that represent those players are not within sufficient distance of each other in the game's virtual environment.

Some multiplayer network games incorporate a text chat system for players to communicate. For example, Id Software, Inc.'s QUAKE III™ enables players in a game session to type text messages to each other. This text chat system is similar to conventional stand-alone text chat systems, wherein a user types a message into a text entry box and sends the message by pressing the Enter key. The message appears as text on each receiver's display screen. The author of the text message is indicated on the display, since the author's identifier precedes the text message sent by the author. However, the text message and author identifier are not displayed on a receiver's display screen until after the author finishes typing the message and presses the Enter key. If the author's animated character is visible to other players in the game session, the author's animated character might be destroyed by an opposing player who did not know that the author was busy typing a text message, and could not concurrently move the author's animated character out of harm's way. To alleviate this problem, QUAKE III™ may display a chat bubble over the author's animated character when the author begins to type a text message. The chat bubble appears only if the author's animated character is displayed on a receiver's display screen. If the author's animated character is not visible on a receiver's display screen, a chat bubble is not displayed, and there is no other indication that the author is typing a text message. Instead, the text message appears on the receiver's display screen only after the author presses the Enter key. The QUAKE III™ game is also similar to conventional chat sessions in its display of text messages in sequential order.

As a further enhancement, a player can bind a text message to a key, so that the user can simply press the key to send a predefined text message. In this case, there is no need to display a chat bubble, because the text message quickly appears on each receiver's display screen. However, if most players only use predefined text messages, a chat bubble may never appear over the senders' animated characters. In that case, other players may find it difficult or impossible to determine which animated character corresponds to a particular predefined text message. For those players who physically type text messages causing a chat bubble to be displayed, the authoring player must interrupt their game play to input the text message. If multiple players start inputting text messages, the game play may effectively stop, because the remaining player(s) may not wish to unfairly or inadvertently harm an animated character that is vulnerable while the corresponding player(s) are inputting a text message.

Thus, it is preferable to use immediate voice communication to reduce interruptions to the game session. It is also preferable to visually identify anonymous speakers, so that each player can better control and react to voice communication with other players. Further, voice communication can be mixed, so that multiple speakers can be heard at the same time. Accordingly, it is desirable to visually identify those players that are speaking. In addition, it is desirable that the voice communications be affected by the environment in the game session, such as by varying the volume of a speaker based on a distance between the animated characters of the speaker and the listener. The concept is clearly also applicable to other virtual environment applications in which voice communication by entities in the environment occurs.

SUMMARY OF THE INVENTION

The present invention is directed to a method and system for visually identifying one or more voice speakers to a listener in a computing session. For each voice speaker, a listener's computing device receives voice data that include a speaker identifier. The speaker identifier is associated with a visual indicator that is displayed to the listener to identify the voice speaker and indicate that the voice speaker is currently speaking. The visual indicator is preferably associated with an element of the computing session that is controlled by the voice speaker. For example, an animated game character controlled by the voice speaker can be highlighted to visually associate the current voice communication with the highlighted game character. This visual indication enables the listener and/or a moderator of the computing session to control voice communication. For instance, the listener and/or moderator can mute a voice speaker associated with a particular game character. Preferably, the visual indicator also identifies the voice speaker by a name such as an alias, so that the listener and/or moderator can select the name from a list of names to control voice communication, enabling a listener to identify and select voice speakers from among a plurality of anonymous voice speakers whose communication is mixed and heard together by the listener.

The visual indicator can also take many other forms. A common icon can be displayed adjacent to the visual element that is controlled by the voice speaker in the computing session. The same icon can be displayed adjacent to each visual element associated with each voice speaker who is speaking. Alternatively, a different icon can be displayed for each voice speaker. The different icons can be displayed adjacent to the corresponding visual elements of the computing session, or the different icons can be displayed in a predetermined location on the listener's display screen, if the voice speaker's visual element is not currently displayed. Different icons can also be displayed adjacent to names of voice speakers in a list of participants in the computing session.

One benefit of a visual indicator is to provide control to the listener over voice communication that may come from numerous anonymous speakers who might abuse the voice communication. The present invention provides this control by first determining whether the listener has elected to hear voice communications from a given voice speaker. For example, the listener's computing device can first determine whether the listener has muted voice communications from the voice speaker. Alternatively, or additionally, the listener's computing device can determine whether the voice speaker is trusted by the listener. Trust can be established and recorded by the listener or provided by another party. For instance, a manual or automatic moderator of the computing session can gather feedback about a voice speaker from other participants in the computing session and determine whether the voice speaker meets community standards for voice communication. If the voice speaker has not met community standards, the moderator of the computing session can temporarily or permanently prohibit the voice speaker from communicating via voice in subsequent computing sessions. Alternatively, a trusted third party can be used to issue a certificate for voice communication that is acceptable by the listener.

Another form of voice communication control is based on events or a state of the computing session. The computing session and/or the listener's computing device can determine whether the voice speaker's animated character is within an audible range of the listener's animated character within the virtual environment of the computing session. The computing session and/or the listener's computing device can adjust a volume or other audible characteristic as a function of the distance between characters or as a function of another state of the computing session. An event occurring in the computing session can also cause the voice speaker's communication to be modified or eliminated. For example, the listener's animated character might be imprisoned in a simulated sound-proof room or move behind a thick wall.

Another aspect of the invention is directed to a memory medium that stores machine instructions for carrying out the steps described above and in accord with the present invention, as discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to an exemplary use in providing visual indications of voice speakers for an electronic gaming system that is designed to execute gaming software in coordination with a network gaming service. Those skilled in the art will recognize that the present invention may also be implemented for other anonymous or semi-anonymous voice communications between speakers engaged in a common session. The invention may also be practiced on a variety of computing machines such as a personal computer (PC), a set-top box, an arcade game, a hand-held device, a high fidelity system, and other related systems.

Exemplary Operating Environment

Figure 1:
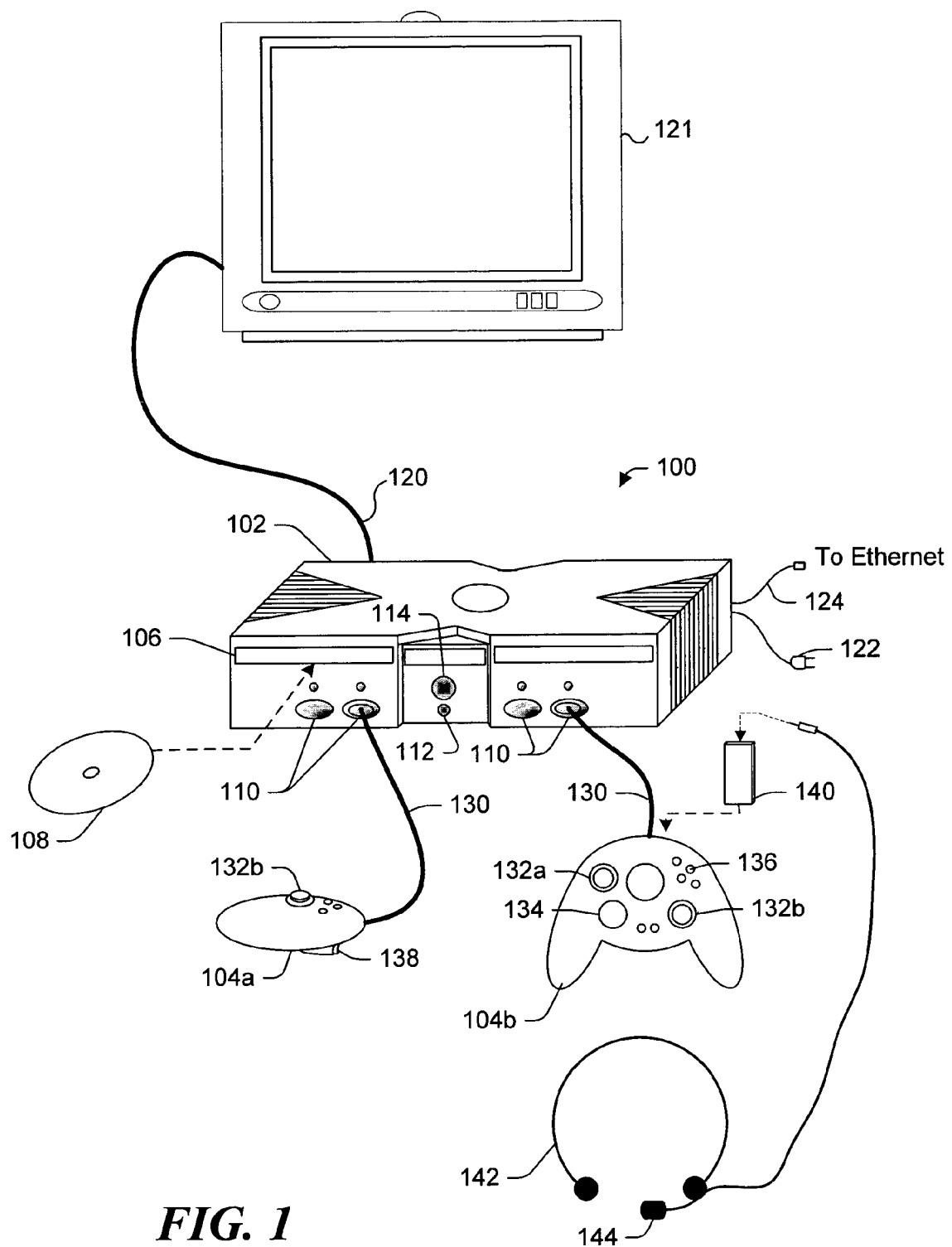
FIG. 1 illustrates an exemplary electronic gaming system that includes a game console and support for up to four user input devices.

As shown in FIG. 1, an exemplary electronic gaming system 100 that is suitable for practicing the present invention includes a game console 102 and support for up to four user input devices, such as controllers 104a and 104b. Game console 102 is equipped with an internal hard disk drive (not shown in this Figure) and an optical media drive 106 that reads various forms of portable optical storage media, as represented by an optical storage disc 108. Examples of suitable portable storage media include digital versatile discs (DVDs) and compact disk-read only memory discs (CD-ROMs). In this gaming system, game programs are preferably distributed for use with the game console on DVD discs, but it is also contemplated that other storage media might instead be used on this or other types of systems that employ the present invention.

On a front face of game console 102 are four slots 110 for connection to supported controllers, although the number and arrangement of the slots may be modified as needed to support more or fewer controllers. A power button 112, and an eject button 114 are also positioned on the front face of game console 102. Power button 112 controls application of electrical power to the game console, and eject button 114 alternately opens and closes a tray (not shown) of optical media drive 106 to enable insertion and extraction of storage disc 108, so that the digital data on it can be read for use by the game console.

Game console 102 connects to a television 121 or other display monitor or screen via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch (not shown), or over the Internet, for example, through a connection to an xDSL interface, a cable modem, or other broadband interface (not shown). Other types of game consoles that implement the present invention may be coupled together or to a remote server, by communicating using a conventional telephone modem.

Each controller 104a and 104b is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into each controller 104a and 104b to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. The circuitry of the voice communication unit may alternatively be integrated into the controller, and a headset with boom microphone may be removably or permanently connected to the controller. Preferably, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from a MU. For example, gaming system 100 is potentially capable of playing:

Game titles stored on CD and DVD discs read by the optical media drive, stored on the hard disk drive, or downloaded from an online source;

Digital music stored on a CD ready by optical media drive 106, in a file on the hard disk drive (e.g., WINDOWS MEDIA AUDIO™ (WMA) format), or derived from online streaming sources on the Internet or other network; and Digital A/V data stored on a DVD disc read by optical media drive 106, or in files stored on the hard disk drive (e.g., in an Active Streaming Format), or accessed from online streaming sources over the Internet or other network.

Figure 2:
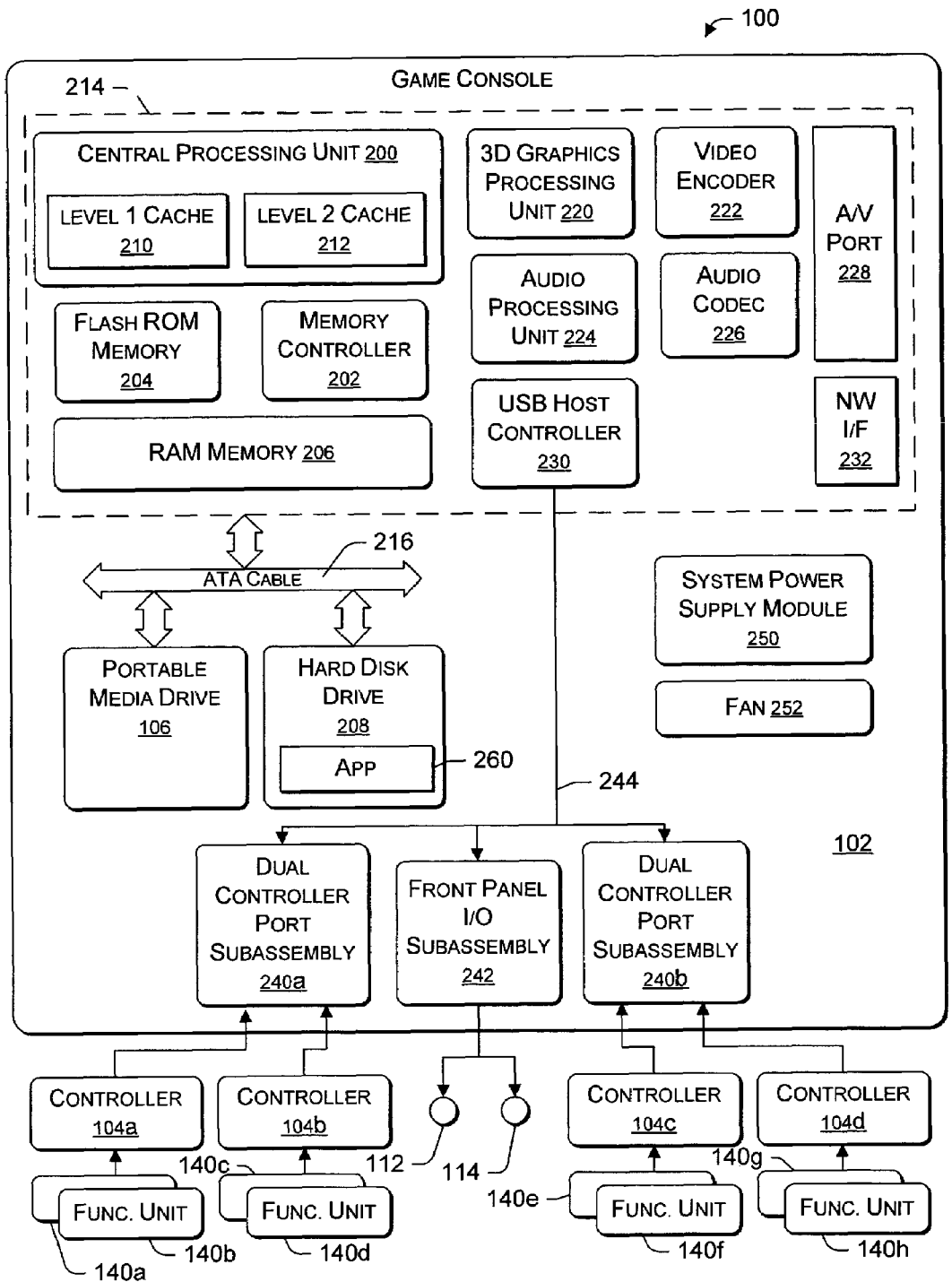
FIG. 2 is a functional block diagram showing components of the gaming system of FIG. 1 in greater detail.

FIG. 2 shows functional components of gaming system 100 in greater detail. Game console 102 includes a CPU 200, a memory controller 202 that facilitates CPU access to a read-only memory (ROM) 204, a random access memory (RAM) 206, a hard disk drive 208, and portable optical media drive 106. CPU 200 is equipped with a level 1 cache 210 and a level 2 cache 212 to temporarily store data so as to reduce the number of memory access cycles required, thereby improving processing speed and throughput of the gaming system. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a micro channel architecture (MCA) bus, an enhanced ISA (EISA) bus, a Video Electronics Standards Association (VESA) local bus, and a peripheral component interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple double data rate synchronous dynamic RAM modules (DDR SDRAM modules) that are independently controlled by memory controller 202 via separate buses (not shown). Hard disk drive 208 and optical media drive 106 are connected to the memory controller via the PCI bus and an advanced technology attachment (ATA) bus 216.

A 3D graphics processing unit (GPU) 220 and a video encoder 222 form a video processing pipeline for high-speed and high-resolution graphics processing. Data are conveyed from GPU 220 to video encoder 222 via a digital video bus (not shown). An audio processing unit 224 and an audio encoder/decoder (CODEC) 226 form a corresponding audio processing pipeline for high fidelity and stereo audio data processing. Audio data are conveyed between audio processing unit 224 and audio CODEC 226 via a communication link (not shown). The video and audio processing pipelines output data to an A/V port 228 for transmission to the television or other display monitor. In the illustrated implementation, video and audio processing components 220-228 are mounted on module 214.

Also implemented on module 214 are a USB host controller 230 and a network interface 232. USB host controller 230 is coupled to CPU 200 and memory controller 202 via a bus (e.g., the PCI bus), and serves as a host for peripheral game controllers 104a-104d. Network interface 232 provides access to a network (e.g., the Internet, home network, etc.) and may include any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, and each subassembly supports two of game controllers 104a-104d. A front panel input/output (I/O) subassembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight function units 140a-140h are illustrated as being connectable to four controllers 104a-104d, i.e., two function units for each controller. Each function unit offers additional functionality or storage for games, game parameters, and other data. When an MU is inserted into a controller, the MU can be accessed by memory controller 202.

A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210 and/or 212 for execution by CPU 200. Portions of software application 260 may be loaded into RAM only when needed, or all of the software application (depending on its size) may be loaded into RAM 206. Software application 260 and the relevant functions that it performs to implement the present invention are described below in greater detail.

Gaming system 100 may be operated as a stand-alone system by simply connecting the system to a television or other display monitor. In this standalone mode, gaming system 100 enables one or more users to play games, watch movies, or listen to music. However, with connectivity to the Internet or other network, which is made available through network interface 232, gaming system 100 may be further operated as a component of a larger network gaming community, to enable online multiplayer interaction in games that are played over the Internet or other network with players using other gaming systems. Gaming system 100 can also be coupled in peer-to-peer communication with another gaming system using the network interface and an appropriate cable (not shown).

Network System

Figure 3:
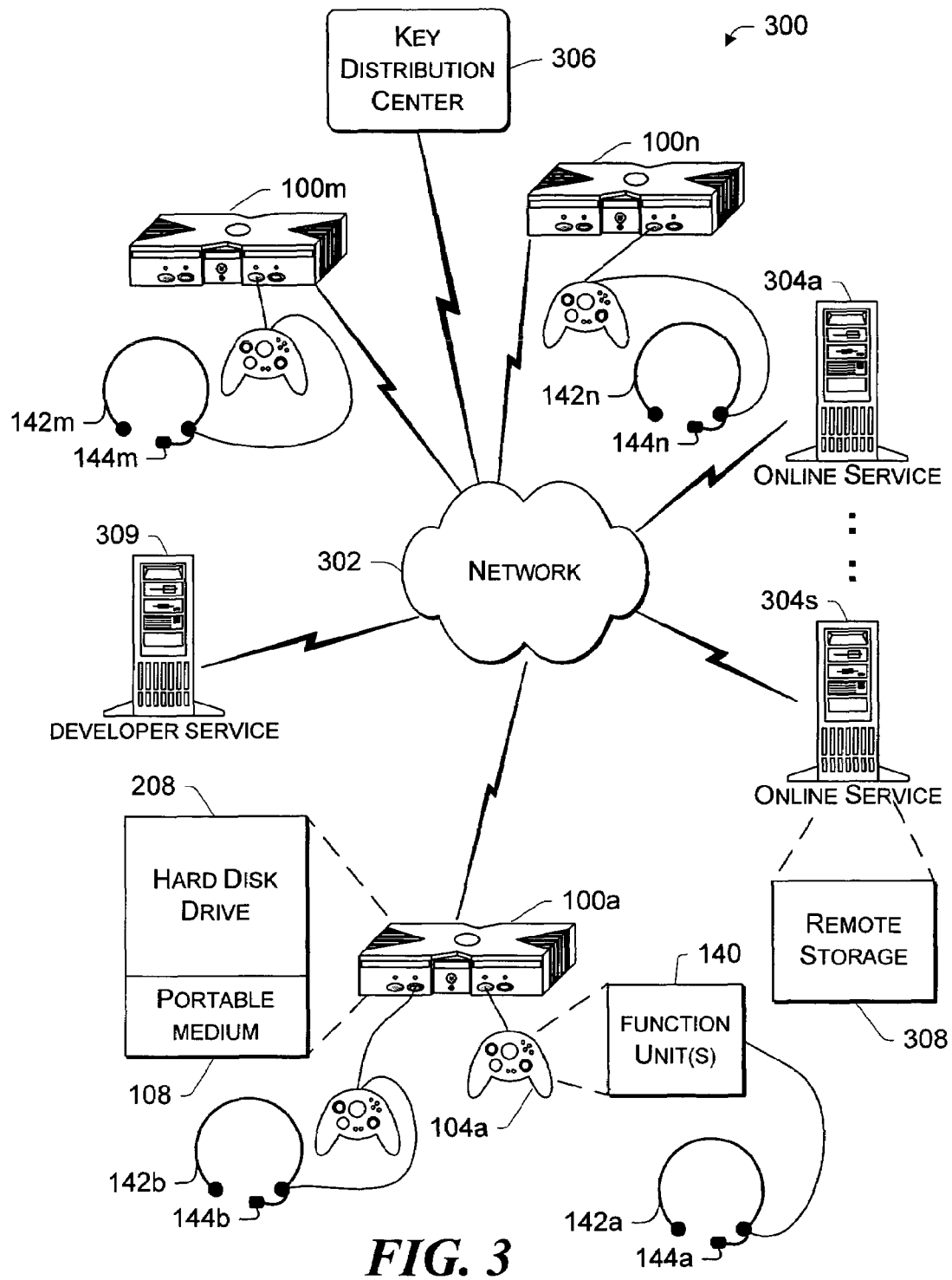
FIG. 3 is a schematic diagram showing an exemplary network gaming environment that interconnects multiple gaming systems like that shown in FIGS. 1 and 2 over a network.

FIG. 3 shows an exemplary network gaming environment 300 that interconnects multiple gaming systems 10a, . . . 100n via a network 302. Preferably, each gaming system includes at least one corresponding headset 142a, . . . 142n and corresponding microphone 144a, . . . 144n for voice communication between players. Network 302 represents any of a wide variety of data communication networks and may include public portions (e.g., the Internet), as well as private portions (e.g., a residential or commercial local area network (LAN)). Network 302 may be implemented using any one or more of a wide variety of conventional communication configurations, including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100a, . . . 100n, one or more online services 304a, . . . 304s are accessible via network 302 to provide various services for the participants, such as serving and/or hosting online games, serving downloadable music or video files, hosting gaming competitions, serving streaming A/V files, enabling exchange of email or other media communications, and the like. Network gaming environment 300 may further employ a key distribution center 306 that plays a role in authenticating individual players and/or gaming systems 100a, . . . 100n for interconnection to one another, as well as to online services 304a, . . . 304s. Distribution center 306 distributes keys and service tickets to valid participants that may then be used to form game playing groups including multiple players, or to purchase services from online services 304a, . . . 304s.

Network gaming environment 300 introduces another memory source available to individual gaming systems 100a, . . . 100n, i.e., online storage. In addition to accessing data on optical storage disc 108, hard disk drive 208, and function unit 140, gaming systems 100a, . . . 100n can also access data files available at remote storage locations via network 302, as exemplified by remote storage 308 at online service 304s.

Network gaming environment 300 further includes a developer service 309 with which developers can produce media effects, updated media data, game code, and other services. Such services can be distributed between the online services and the producers of games for the gaming systems, and between other devices within, and outside of network gaming environment 300. It should be noted that the network gaming environment can be a closed network, providing only access to other gaming systems and the gaming environment, using for example, communication through virtual private network tunnels to provide enhanced security and limit access by other computing devices.

Exemplary Process

Figure 4:
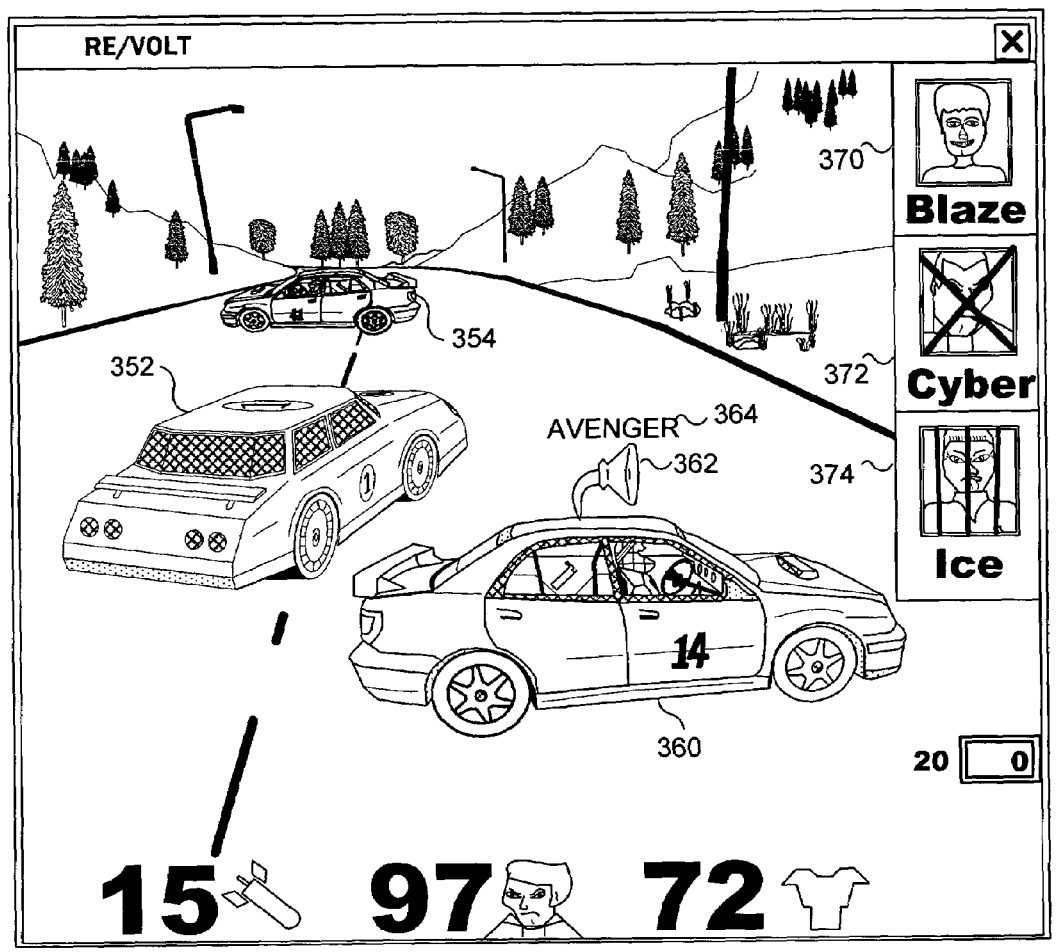
FIG. 4 is an exemplary scene from a multiplayer network game session, illustrating visual indicators of voice speakers.

A preferred embodiment of the present invention is directed to displaying a visual indication to identify a voice speaker in a multiplayer game session. FIG. 4 illustrates an exemplary scene 350 from a multiplayer network game session. Scene 350 includes a listener's vehicle 352 that is controlled by a human player through a local gaming system. Scene 350 also includes a non-speaking opponent's vehicle 354 that is controlled by a human player through a remote gaming system. The player using the remote gaming system is not currently using a voice communicator to communicate with the local listener. Also visible in scene 350 is a speaking opponent's vehicle 360 that is controlled by a human player that is currently speaking through a voice communicator attached to another remote gaming system. When the speaking player begins speaking, a speaker icon 362 is displayed over speaking player's vehicle 360 to identify the current speaker. Preferably, a player ID 364 (e.g., a Gamertag) is also displayed along with speaker icon 362 to associate the speaker with the speaking player's vehicle 360. Those skilled in the art will recognize that many other visual displays indicative of the player who is speaking may be provided, such as highlighting the speaker's vehicle, providing an image away from the speaker's vehicle, illuminating a spot next to a speaker's name, or using some other visual indication.

Other indications can be provided to show that other players are speaking while their corresponding vehicles are not visible in the current scene. For example, an off screen speaker icon 370 can be displayed when another remote player is speaking, but the remote player's corresponding vehicle is not visible to the local listener on the local listener's display. Preferably, the off screen speaker's icon also includes a player ID or Gamertag to identify the off screen speaker. Optionally, a muted player's icon 372 can be displayed when an undesired remote speaker is speaking, but the listener has muted that undesired speaker's voice communication. Muted speaker's icon 372 can serve to remind the listener of those players who have been muted. Other indications can optionally be used by the gaming service to indicate those players who may be subject to some form of global voice sanction. For example, a censored speaker icon 374 can indicate that a particular player is temporarily prohibited from using voice communication. A player can be temporarily or permanently prohibited from using voice communication and/or from hearing voice communication from the local player. This censoring can be invoked by the network gaming service or by the local player. For example, the local player may wish to prohibit voice communication to and from any player other than team members. The gaming service can prohibit voice communication for an infraction of gaming service rules, as a result of an event during the game, or for other reasons.

Figure 5A:
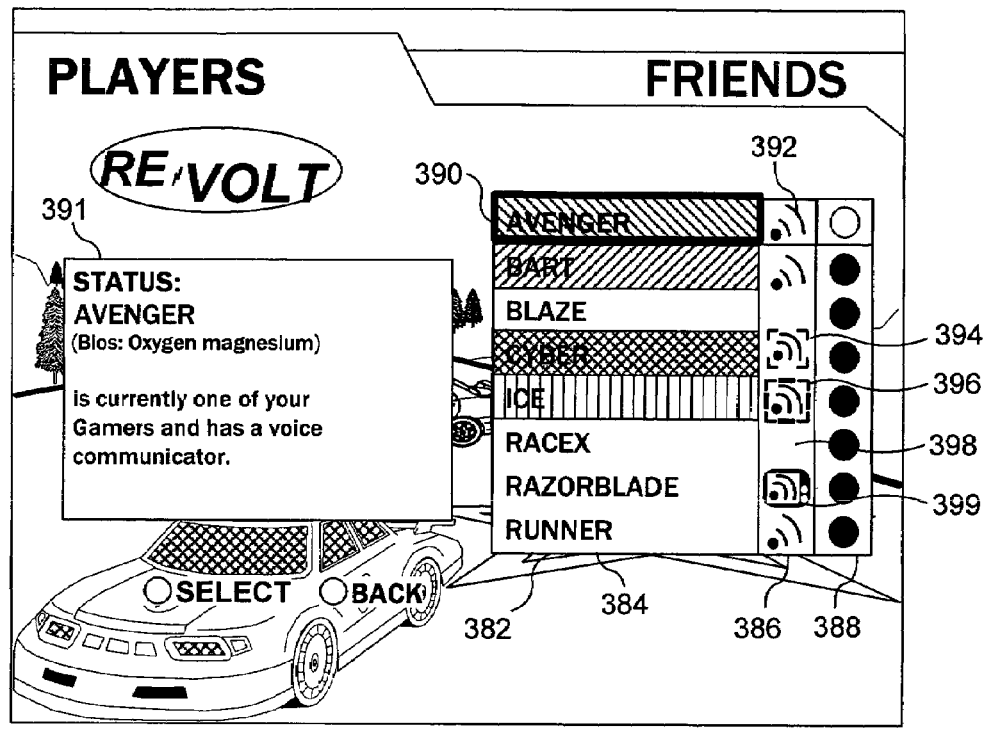
FIG. 5A is an exemplary screen of a players tab that provides information on players in a current game session.

A current speaker can also be visually indicated on a players list along with more detailed information regarding each player's voice communication status. For example, FIG. 5A is an exemplary screen of a players tab view 380A that provides information on players in the current game session. A player's list 382 includes a player ID column 384, a voice communication status column 386 and a friend status column 388. A current speaker's player ID 390 can be highlighted or otherwise visually indicate that a remote player is speaking. A corresponding talk enabled icon 392 indicates that the corresponding player has an active voice communicator. A muted icon 394 indicates that the local listener has muted voice communication from a selected player. A persistent bidirectional mute icon 396 indicates that the local listener or the network gaming service has prohibited the corresponding player from speaking to the listener and hearing any voice communication from the listener. A null icon 398 indicates that a corresponding player does not have a voice communicator. A hear-only icon 399 indicates that a corresponding player can hear voice communication but does not have a microphone for speaking to other players. Further explanation about a selected player's voice communication capability is preferably provided in a player's status box 391.

Figure 5B:
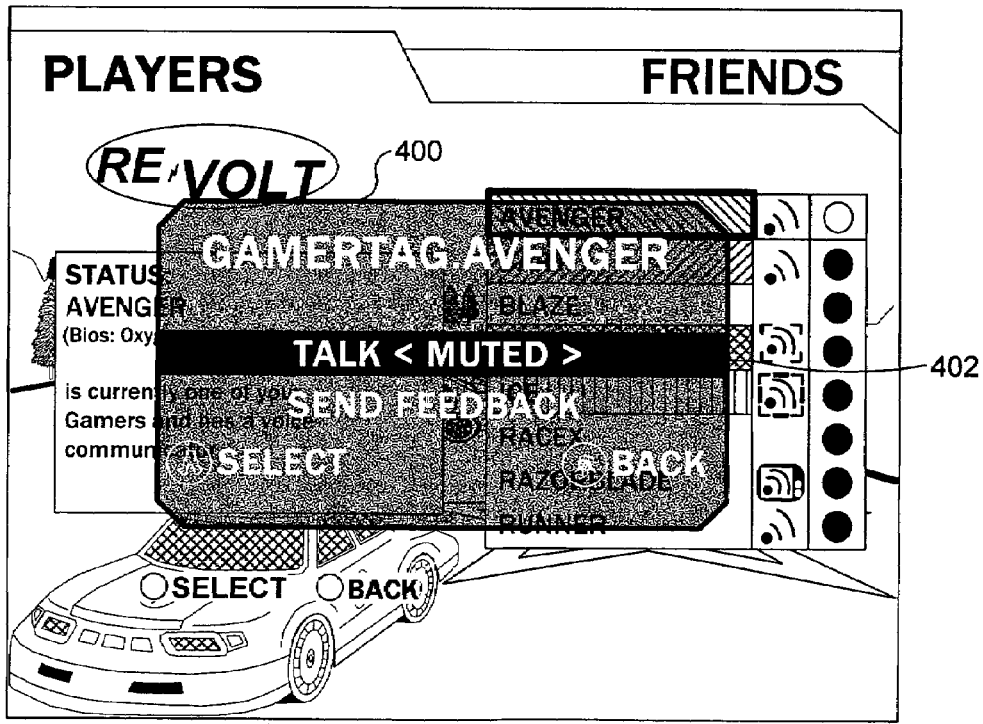
FIG. 5B is an exemplary screen of a players tab that includes a dialog box for changing a local listening setting for a selected player.

A listener (i.e., a local player) can change local listening settings for each player. FIG. 5B is an exemplary screen of a players tab view 380B that includes a dialog box 400 for changing a local listening setting 402 for a selected player. For example, dialog box 400 can be used to mute a selected player.

Figure 6:
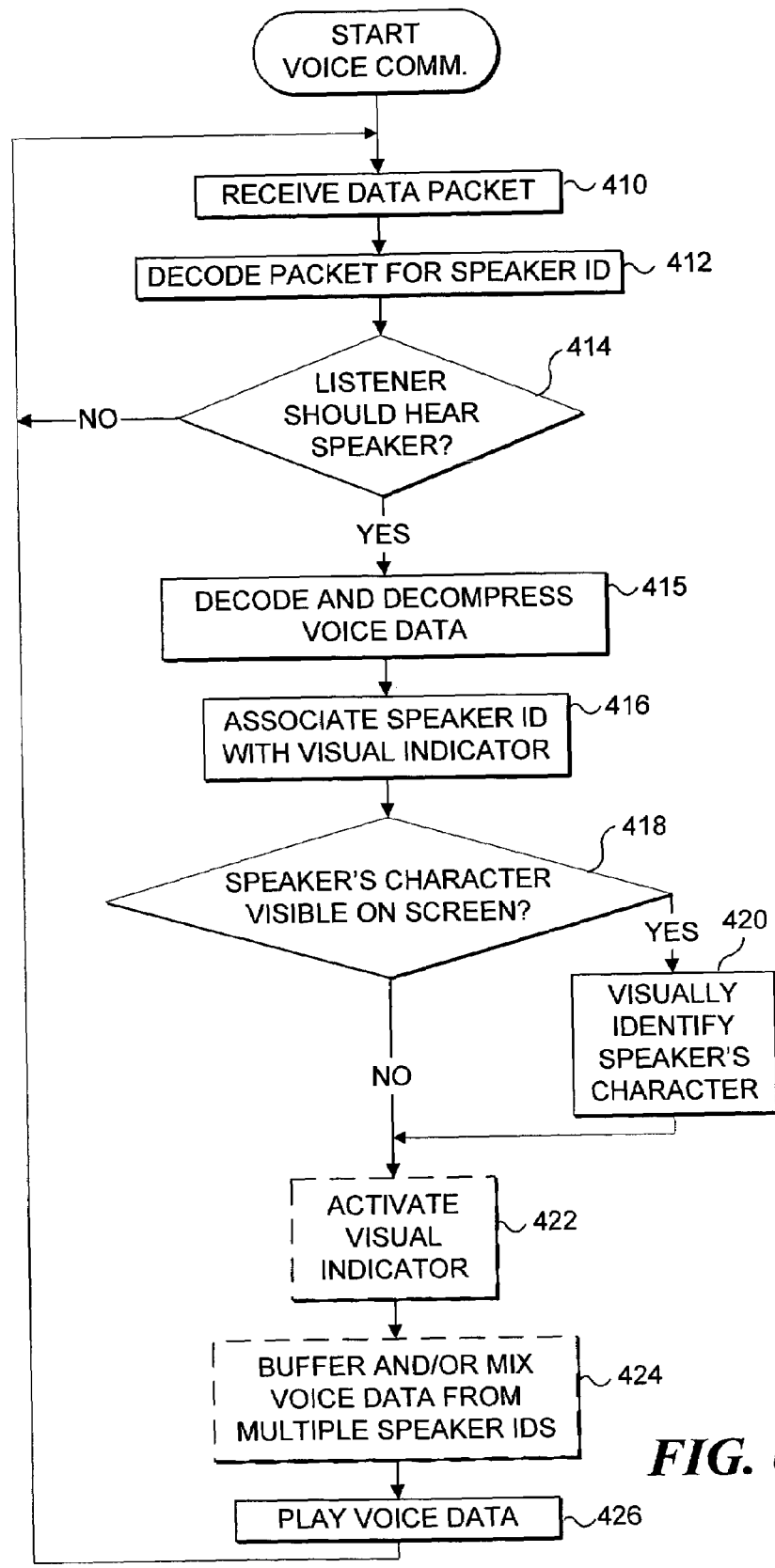
FIG. 6 is a flow diagram illustrating the logic for processing voice communication received by a listening player's gaming system.

FIG. 6 is a flow diagram illustrating the logic for processing voice communication received by a listening player's gaming system. At a step 410, the listener's gaming system receives a data packet that includes voice communication data and may include game data. At a step 412, the gaming system decodes the received packet to obtain a speaker ID from the received packet. The gaming system determines, at a decision step 414, whether the listener has chosen, or is permitted to hear the voice data from the speaker. Further detail regarding this determination is described below with regard to FIG. 7. If the listener's gaming system determines that the listener should not hear the voice data from the speaker, control returns to step 410 to await another data packet.

However, if the listener's gaming system determines that the listener should hear the voice data from the speaker, the listener's gaming system decodes and decompresses the encoded voice data of the data packet at a step 415 and associates the decoded speaker ID with a visual indicator, at a step 416. For example, the listener's gaming system can associate the decoded speaker ID with the speaker's corresponding vehicle or display icon.

At a decision step 418, the listener's gaming system determines whether the speaker's vehicle, animated character, or other control game element is visible to the listener on the listener's display. If the speaker's character is currently visible to the listener, the listener's gaming system highlights the speaker's character in the display, at a step 420. For example, a speaker icon and player ID will be displayed over the speaker's character. As indicated above, other indications can include increasing the intensity of the speaker's character, causing the speaker's character's lips to move, providing a bubble over the character with or without a text version of the speaker's voice communication, or other indications associated with the speaker's character. In addition to highlighting the speaker's character, or if the speaker's character is not currently visible to the listener, the gaming system activates an alternate visual indicator at a step 422. For example, a separate icon may be displayed at one edge of the listener's display screen. Alternatively, the speaker's player ID can be highlighted in the player list.

At an optional step 424, the listener's gaming system can adjust the voice data or perform other audio processing. For example, the speaker's voice data may be adjusted to sound like an elf, sound like a preselected gender which may be the same or different than that of the speaker, or have other characteristics that alter the sound of the speaker's voice. Alternatively, or in addition, the volume of the speaker's voice data may be adjusted to reflect the proximity of the speaker's character to the listener's character in the gaming virtual environment. Further, the speaker's voice data can be buffered to prevent jitter or other undesirable effects. The speaker's voice data can also be mixed with voice data from other speakers so that the listener hears multiple voices at the same time. These multiple voices can include the listener's own voice if the listener is also speaking. Once any desired adjustments to the sound characteristics are made, the listener's gaming system plays the voice data through the listener's headphones or fixed speakers, at a step 426. Control then returns to step 410 to await another data packet.

Figure 7:
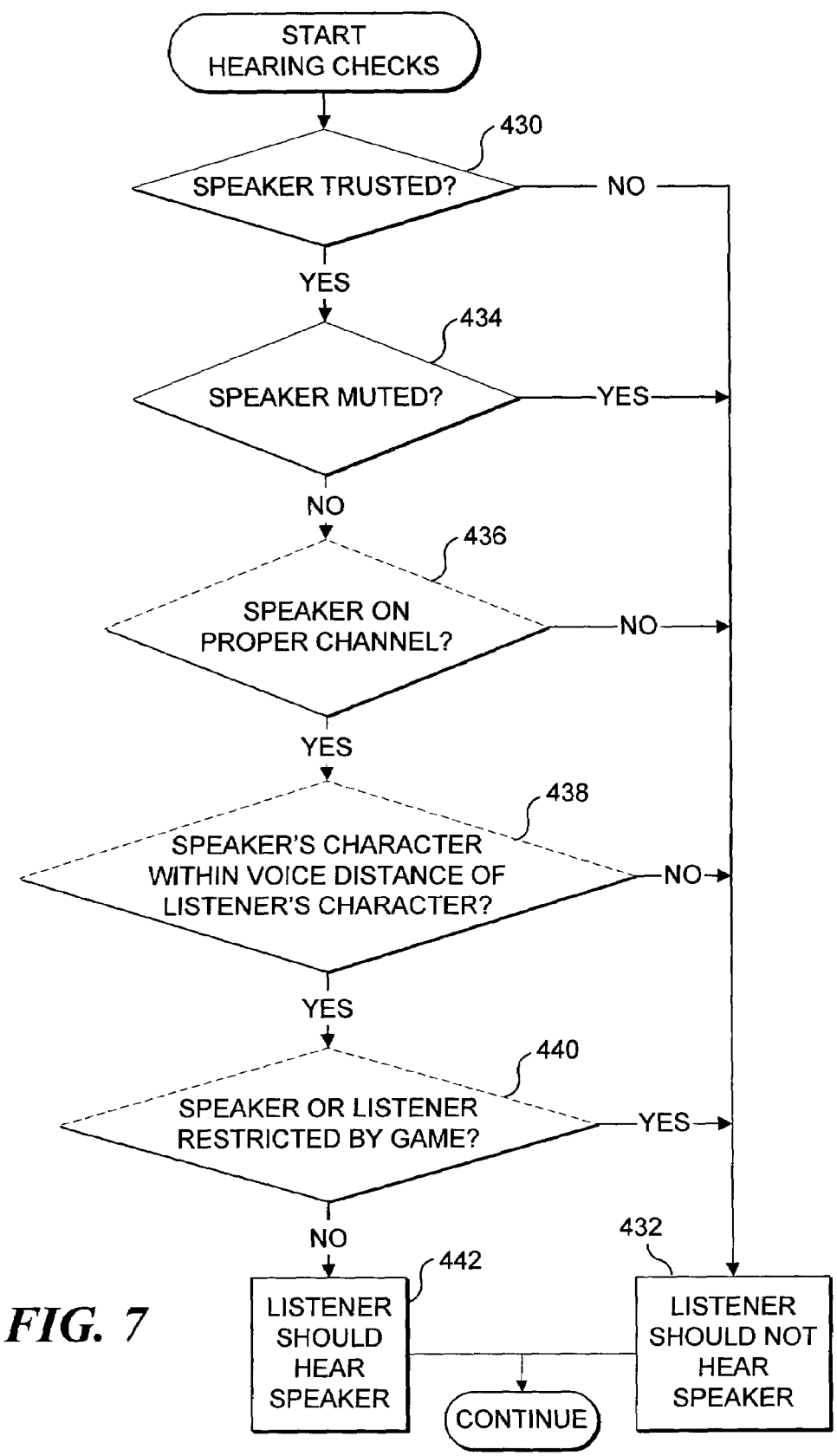
FIG. 7 is a flow diagram illustrating the logic for performing a number of hearing checks to determine whether the listener should hear the received voice data.

FIG. 7 is a flow diagram illustrating the logic for performing a number of hearing checks to determine whether the listener should hear the received voice data. FIG. 7 provides further detail for decision step 414 in FIG. 6. At a decision step 430 in FIG. 7, the listener's gaming system determines whether the speaker is trusted. For example, the listener may selectively choose to hear voice communications only from players that are on the listener's team. Alternatively, or in addition, the listener may selectively choose to receive voice communications only from those speakers who have obtained a special voice communication certificate from the network gaming service's key distribution center, or from a trusted third party. If the listener's gaming system determines that the speaker is not trusted, control passes to a step 432 to prevent further processing of the speaker's voice data. Additional processes can include reporting the speaker's attempted communication, providing an automatic message to the speaker, or error processing.

If the speaker is trusted, the listener's gaming system determines, at a decision step 434, whether the speaker was muted by the listener or by the gaming service. If so, the listener's gaming system ignores the speaker's voice data or performs other non-audio processing at step 432. For example, the listener's gaming system can display an icon corresponding to the speaker ID to indicate that the speaker is trying to communicate with the listener. However, the voice data will not be routed to the listener's headset or fixed speakers.

At a decision step 436, the listener's gaming system can optionally determine whether the speaker has communicated over an acceptable channel. For example, a team of players may select a channel for secure voice communications. If the speaker is not communicating over the secure channel, the listener's gaming system processes the speaker's voice data at step 432.

The listener's gaming system can also optionally determine, at a decision 438, whether the speaker's character, vehicle, or other controlled game element is within a sufficient hearing distance of the listener's controlled game element. For example, if the speaker's animated character is in a different building of the gaming environment than the listener's character, and the characters are not in radio communication, the speaker's voice data are blocked and not heard by the listener. As discussed above, the speaker's voice data can alternatively be varied in volume as a function of the distance between the speaker and the listener characters. Similarly, at a decision step 440, the listener's gaming system optionally determines whether the speaker or listener are otherwise restricted by the game. For example, the speaker's character or the listener's character might be in a penalty box or a silence booth as part of the game play. In that case, the listener's gaming system prevents the listener from hearing the speaker or performs other non-audio processing at step 432. However, if the above decisions indicate that the listener should hear the speaker, the listener's gaming system enables the listener to hear the speaker's voice data at a step 442. Those skilled in the art will recognize that other decision steps can be included and the decision steps discussed above may be arranged in other logical configurations other than the indicated straight sequential order.

Although the present invention has been described in connection with the preferred form of practicing it and modifications thereto, those of ordinary skill in the art will understand that many other modifications can be made to the present invention within the scope of the claims that follow. For example, speakers can be visually identified within a local network of gaming systems independent of a networked gaming service. Accordingly, it is not intended that the scope of the invention in any way be limited by the above description, but instead be determined entirely by reference to the claims that follow.

The invention in which an exclusive right is claimed is defined by the following:

1. A method for visually indicating a voice speaker to a listener in a context of a computing session, comprising the steps of:
   (a) obtaining a speaker identifier, the speaker identifier including a user name gamertag, from voice data transmitted by the voice speaker;
   (b) associating the speaker identifier with a visual indicator used for indicating voice speakers;
   (c) selectively and temporarily, when the voice speaker is speaking, displaying the visual indicator and selectively and temporarily, when the voice speaker is speaking, displaying the user name gamertag, and when the visual indicator and the user name gamertag are displayed, displaying the visual indicator and the user name adjacent to one another, on the display to indicate that the voice speaker is speaking;
   (d) receiving user input selecting a players tab view that provides information on players in a current game session and in response to receiving user input selecting a players tab view:
      displaying a player's list including a player ID column listing gamertags for players in a current game session, and
      displaying a voice communication column capable of selectively displaying for each of the players in the player ID column each of: a muted icon that indicates that a local listener has muted voice communication from a selected player, a persistent bidirectional mute icon that indicates that the local listener or the network gaming service has prohibited the corresponding player from speaking to the listener and hearing any voice communication from the listener, a null icon that indicates that a corresponding player does not have a voice communicator, and a hear-only icon that indicates that a corresponding player can hear voice communication but does not have a microphone for speaking to other players.

2. The method of claim 1, wherein prior to the step of displaying, further comprising the step of determining whether the listener has elected to hear voice communications from the voice speaker.

3. The method of claim 2, wherein the step of determining comprises at least one of the steps of:
   (a) determining whether the listener has muted voice communications from the voice speaker; and
   (b) determining whether the voice speaker provided evidence that the voice speaker is trusted by the listener, so that voice communications from the voice speaker are allowed to be heard by the listener.

4. The method of claim 1, wherein prior to the step of displaying, further comprising the step of determining whether the listener is prohibited from hearing voice communications from the voice speaker.

5. The method of claim 4, wherein the step of determining comprises at least one of the steps of:
   (a) determining whether the voice speaker has been muted in the computing session; and
   (b) determining whether the voice speaker is restricted from voice communication as a result of one of an event occurring in the computing session and a status of the computing session.

6. The method of claim 1, further comprising modifying the voice data as a function of a status of at least one of the voice speaker and the listener in the computing session.

7. The method of claim 1, further comprising the step of mixing the voice data from the voice speaker with voice data from another voice speaker to provide the listener with a multi-voice communication.

8. The method of claim 1, further comprising modifying the voice data as a function of a predefined characteristic selected by the voice speaker.

9. The method of claim 8, wherein modifying the voice data as a function of a predefined characteristic selected by the voice speaker comprises adjusting the voice data to sound like an elf.

10. The method of claim 8, wherein modifying the voice data as a function of a predefined characteristic selected by the voice speaker comprises adjusting the voice data to sound like a preselected gender.

11. The method of claim 1, further comprising changing the appearance of a visual element that is controlled by the voice speaker in the computing session by moving a mouth on a character controlled by the voice speaker.

12. The method of claim 1, further comprising displaying to the listener a muted speaker identifier when an undesired voice speaker is speaking and when the undesired voice speaker's voice communication has been muted with respect to the listener.

13. The method of claim 1, further comprising displaying to the listener an indicator that a player is prohibited from speaking to the listener or hearing any voice communication from the listener.

14. The method of claim 1, further comprising displaying an indicator indicating that a participant does not have a voice communicator.

15. The method of claim 1, further comprising displaying an indicator indicating that a participant can hear voice communications, but does not have a microphone.

16. A memory medium on which are stored machine instructions for carrying out the following acts:
   (a) obtaining a speaker identifier, the speaker identifier including a user name gamertag, from voice data transmitted by the voice speaker;

(b) associating the speaker identifier with a visual indicator used for indicating voice speakers;

(c) selectively and temporarily, when the voice speaker is speaking, displaying the visual indicator and selectively and temporarily, when the voice speaker is speaking, displaying the user name gamertag, and when the visual indicator and the user name gamertag are displayed, displaying the visual indicator and the user name adjacent to one another, on the display to indicate that the voice speaker is speaking;

(d) receiving user input selecting a players tab view that provides information on players in a current game session and in response to receiving user input selecting a players tab view:

displaying a player's list including a player ID column listing gamertags for players in a current game session, and displaying a voice communication column capable of selectively displaying for each of the players in the player ID column each of: a muted icon that indicates that a local listener has muted voice communication from a selected player, a persistent bidirectional mute icon that indicates that the local listener or the network gaming service has prohibited the corresponding player from speaking to the listener and hearing any voice communication from the listener, a null icon that indicates that a corresponding player does not have a voice communicator, and a hear-only icon that indicates that a corresponding player can hear voice communication but does not have a microphone for speaking to other players.

17. A system for visually indicating a voice speaker to a listener in a context of a computing gaming session, comprising:

(a) a processor;

(b) a display in communication with the processor; and (c) a memory in communication with the processor, said memory storing machine instructions that cause the processor to carry out a plurality of functions, including:

(i) obtaining a speaker identifier, the speaker identifier including a user name gamertag, from voice data transmitted by the voice speaker;

(ii) associating the speaker identifier with a visual indicator used for indicating voice speakers;

(iii) selectively and temporarily, when the voice speaker is speaking, displaying the visual indicator and selectively and temporarily, when the voice speaker is speaking, displaying the user name gamertag, and when the visual indicator and the user name gamertag are displayed, displaying the visual indicator and the user name adjacent to one another, on the display to indicate that the voice speaker is speaking;

(iv) receiving user input selecting a players tab view that provides information on players in a current game session and in response to receiving user input selecting a players tab view:

displaying a player's list including a player ID column listing gamertags for players in a current game session, and displaying a voice communication column capable of selectively displaying for each of the players in the player ID column each of: a muted icon that indicates that a local listener has muted voice communication from a selected player, a persistent bidirectional mute icon that indicates that the local listener or the network gaming service has prohibited the corresponding player from speaking to the listener and hearing any voice communication from the listener, a null icon that indicates that a corresponding player does not have a voice communicator, and a hear-only icon that indicates that a corresponding player can hear voice communication but does not have a microphone for speaking to other players.

18. The system of claim 17, wherein prior to displaying the visual indicator, the machine instructions further cause the processor to carry out the function of determining whether the listener has elected to hear voice communications from the voice speaker.

19. The system of claim 18, wherein the machine instructions further cause the processor to carry out at least one of the functions of:

(a) determining whether the listener has muted voice communications from the voice speaker; and (b) determining whether the voice speaker provided evidence that the voice speaker is trusted by the listener, so that voice communications from the voice speaker are allowed to be heard by the listener.

20. The system of claim 17, wherein prior to displaying the visual indicator, the machine instructions further cause the processor to carry out the function of determining whether the listener is prohibited from hearing voice communications from the voice speaker.

21. The system of claim 20, wherein the machine instructions further cause the processor to carry out at least one of the functions of:

(a) determining whether the voice speaker has been muted in the computing session; and (b) determining whether the voice speaker is restricted from voice communication as a result of one of an event occurring in the computing session and a status of the computing session.

22. The system of claim 17, wherein the machine instructions further cause the processor to modify the voice data as a function of a status of at least one of the voice speaker and the listener in the computing session.

23. The system of claim 17, wherein the machine instructions further cause the processor to carry out the function of mixing the voice data from the voice speaker with voice data from another voice speaker to provide the listener with a multi-voice communication.

24. The system of claim 17, wherein the machine instructions further cause the processor to the voice data as a function of a predefined characteristic selected by the voice speaker.

* * * * *